March 14, 1967  E. CAPLINGER ET AL  3,308,622
ION PROPULSION SYSTEM WITH ION ENGINE UTILIZING
POWER SUPPLY HOT SURFACE
Filed July 29, 1964

INVENTORS:
EUGENE CAPLINGER
STANTON L. EILENBERG

ATTORNEY:
WILLIAM A. KEMMEL JR.

March 14, 1967  E. CAPLINGER ET AL  3,308,622
ION PROPULSION SYSTEM WITH ION ENGINE UTILIZING
POWER SUPPLY HOT SURFACE
Filed July 29, 1964  2 Sheets-Sheet 2

LEGEND

102- HEAT SOURCE
105- GENERATOR
106- RADIATOR
201- HEAT SOURCE
203- CATHODE
204- ANODE
207- RESERVOIR

*INVENTORS:*
EUGENE CAPLINGER
STANTON L. EILENBERG

*ATTORNEY:*
WILLIAM A. KEMMEL JR.

United States Patent Office 3,308,622
Patented Mar. 14, 1967

3,308,622
ION PROPULSION SYSTEM WITH ION ENGINE UTILIZING POWER SUPPLY HOT SURFACE
Eugene Caplinger, Sierra Madre, and Stanton L. Eilenberg, Woodland Hills, Calif., assignors to Electro-Optical Systems, Inc., Pasadena, Calif., a corporation of California
Filed July 29, 1964, Ser. No. 386,030
8 Claims. (Cl. 60—202)

In general, the present invention involves an ion propulsion system primarily designed for use in a space vehicle. More particularly, the present invention involves an efficient, reliable ion propulsion system adapted to operate for a long time period.

At present, extensive research and development work is being done on a variety of electric propulsion systems including ion propulsion systems. Present ion propulsion systems are usually considered as consisting of a power supply unit which includes a power source unit, a power conversion unit, a waste power disposal unit; and a propulsion unit which includes a propellant supply unit, an ionizer unit, and an accelerator unit. A schematic diagram of the prior art ion propulsion systems is illustrated in FIGURE 1, where the ion propulsion system 10 is composed of a power supply unit 11 and a propulsion unit or ion engine 20. As illustrated, the power supply unit 11 includes a power source 12 which in this case is a heat source such as a nuclear reactor. The power from the power source 12 is sent to the power conversion unit 13, which comprises a conventional system for converting the heat generated by the nuclear reactor 12 into an electrical output of a generator 18. Thus, the power conversion unit 13 involves flowing a working fluid such as a gas or liquid metal through the nuclear reactor 12 to produce a high pressure gas which passes through a turbine 14 and turns the turbine shaft 15. The low pressure gas discharged from the turbine then passes through heat discharge means, specifically, the radiator 16 which condenses it by extracting heat and radiating the heat into space. Then, the condensed fluid is pumped by means of a compressor or liquid metal pump 17 back to the nuclear reactor 12 to repeat the operating cycle. The shaft 15 rotated by the turbine 14 is used to operate an alternating current generator 18 whose output is changed by a conventional electrical converter 19 to direct current to supply the power required by the ion engine 20. A more detailed discussion of the power supply unit of the electric propulsion system is set forth by Corliss in his book entitled: "Propulsion Systems for Space Flight" (1960), pages 98–111.

A schematic diagram of a presently developed contact ion engine propulsion unit 20 which can be used in the ion propulsion system is also illustrated in FIGURE 1. The ion engine 20 illustrated in FIGURE 1 includes a propellant supply means comprising a propellant source such as a reservoir 21 for a liquid propellant such as cesium which is heated by an electrical resistance circuit 22 to vaporize the cesium and send the cesium vapor to the ionizer unit 23 through a conduit 22'. In the ionizer unit 23, the cesium vapor is fed through the rear of porous disks 23' of ionizer material such as tungsten. When heated to a high temperature by the resistance circuit 25, the tungsten disks strip the electrons from the cesium atoms and discharge a beam of cesium ions. Under the influence of the accelerator 24, the cesium ions discharged by the ionizer 23 are ejected from the ion engine 20 at very high velocities to create the thrust for the ion propulsion system. At present, the heating of the ionizer 23 is proposed to be done by an electrical resistance circuit 25 from either the generator 18 or the electrical converter 19 so that the ionizer material is heated to the desired working temperature which may be in the range of 1000–1200° C. However, the bulk of the output of the electrical converter 19 is used to supply the accelerator 24 with direct current.

The present ion propulsion systems, such as the one described above, have a number of limitations and disadvantages which have effectively limited their possible use to situations where the very high specific impulse of the ejected propellant ions can be utilized. Such limitation can be illustrated by the following equation:

$$P = iV + kT^4 + X \tag{1}$$

where:
$P$ = power supplied to ion engine per unit ionizer area;
$iV$ = beam power emitted from ion engine; $i$ is the ionizer current density and $V$ is the ionizer potential;
$kT^4$ = radiative heat loss from ion engine; $k$ is a constant for a specific ion engine under given operating conditions and $T$ is the ionizer temperature; and
$X$ = accelerator drain power loss from thermionic emission.

When the plot of Equation 1 is compared with the plot for 100% efficiency of an ion propulsion engine, a graph such as shown in FIGURE 2 is produced wherein $I_{sp}$ is the specific impulse in seconds and P/T is the power to thrust ratio. The curve A was calculated on the assumption that a theoretical high current density ion engine is utilized such as illustrated in FIG. 1 and the ionizer current density, $i$, is 15 ma./cm.² FIGURE 2 illustrates the fact currently designed ion engines approach 100% efficiency only with very high specific impulses. The reason for this is that the radiative heat loss from the ion engine remains substantially constant as the thrust level decreases and thus very substantially decreases the over-all efficiency at lower values of specific impulses.

Furthermore, the present ion engines are restricted to high current density ionizers in order to maximize the power output and minimize the heat loss of the ion engine for a given size of equipment, but such high current density operation creates substantial problems. One problem caused by the high current density operation is the relatively high erosion rate for the accelerator electrodes. Another problem is that the high current density ionizer is limited to a rear feed system such as illustrated in FIG. 1 which requires small pore ionizer disks whose production is exceedingly difficult. Still another problem raised by the use of a high current density ionizer is the requirement that direct current power be used on the accelerator to limit the coverage of the ionizer by adsorbed neutral atoms.

In view of the foregoing problems, the object of the present invention is an ion propulsion system which is adapted to operate efficiently over a wide range of thrust and specific impulse levels.

Another object of the present invention is an ion propulsion system having relatively simple, reliable construction.

Still another object of the present invention is an ion propulsion system which is adapted to operate with very low ionizer current density.

Still another object of the present invention is an ion propulsion system which is adapted to operate over long periods of time.

Still another objective of the present invention is an ion propulsion system wherein front feed means are used to supply propellant to the ionizer.

Still another object of the present invention is an ion propulsion system wherein the ion engine utilizes alternating current to accelerate the propellant ions.

Other objects and advantages of the present invention will be readily apparent from the following description and drawings which illustrate the preferred exemplary embodiment of the present invention.

In general, the present invention involves an ion propulsion system wherein the power supply means includes a hot ionizing surface such as its radiator and the ion engine utilizes such hot surface as its ionizing surface.

In order to facilitate the understanding of the present invention, reference will now be made to the appended drawings of a preferred specific embodiment of the present invention. Such drawings should not be construed to limiting the invention, which is properly set forth in the appended claims.

Figure 3:
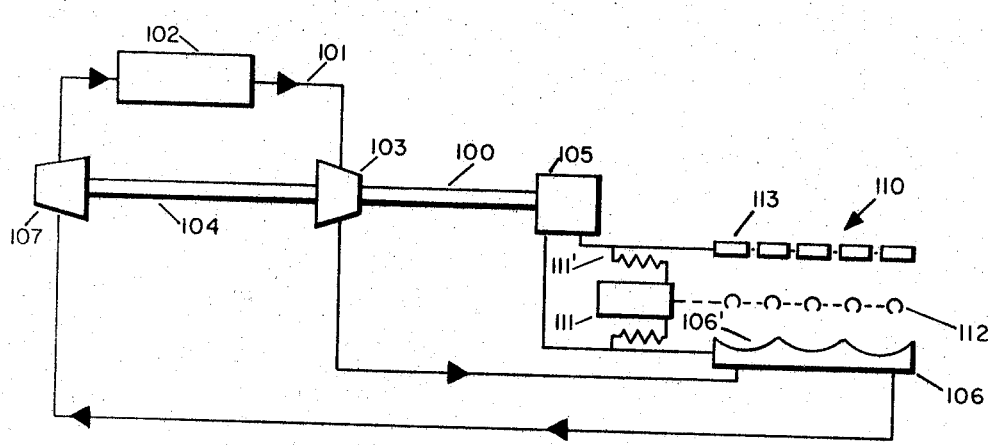
FIG. 3 is a schematic diagram of the ion propulsion system of the present invention using a conventional power source.

In FIG. 3, the ion propulsion system 100 of the present invention includes a power supply means 101 and an ion engine 110. The power supply means 101 of the present invention includes a heat source 102 such as a nuclear reactor or a solar heat source through which is passed a working fluid such as a gas or liquid metal. From the heat source 102, the high temperature and pressure gas passes through a turbine 103 whose shaft 104 is used to operate a generator 105. From the turbine 103, the working fluid then passes through a radiator 106 to discharge the waste heat. Finally, the working fluid is then pumped back to the heat source 102 through a compressor or liquid metal pump 107 to complete the operating cycle.

The ion engine 110 of the ion propulsion system 100 includes a propellant source 111 heated by a resistance circuit 111' which feeds propellant vapor through an appropriate duct work system 112 to bombard one surface 106' of the radiator 106 with the propellant. The surface of the radiator 106' is shaped in a sastrugi confiuration for conveniently directing the resulting propellant ions toward the accelerator 113. Upon leaving the hot ionizing surface 106' of the radiator 106, the propellant ions are ejected by the accelerator 113 to provide the thrust for the ion propulsion system. The accelerator electrode 113 uses the alternating current output of the generator 105 directly to accelerate the propellant ions from the ionizer surface 106'.

The operation of the ion propulsion system 100 is generally as indicated in the above description of the schematic diagram, FIG. 3. The large area ionizer surface 106' allows operation at low current density. The propellant from the propellant source is contacted with the ionizing surface of the power supply means by front feeding and the resulting propellant ions are accelerated by the accelerator electrode. The feed ducts may serve as the accelerator electrode 113 or another electrode of the ion engine 110. Also, the output of the power supply means in the form of alternating current is used directly to operate the accelerator electrode in accelerating the propellant ions. Except for these changes, the apparatus and method of the present invention is constructed and operated in a manner similar to present ion propulsion systems.

Figure 4:
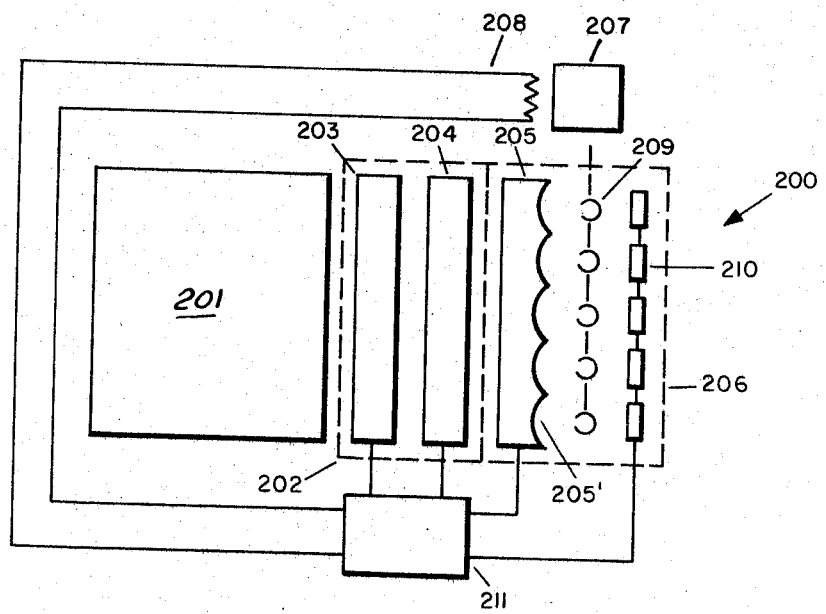
FIG. 4 is similar to FIG. 3 except a thermionic converter is used as a power source.

As illustrated in FIG. 4, the ion propulsion system 200 utilizes a heat source 201 such as a nuclear reactor and heats the cathode surface 203 of a thermionic converter 202. The power output of the thermionic converter 202 is conducted to a power converter 211 which supplies the potential difference for the ion engine 206 and the heating circuit 208. The heat from the anode surface 204 of the thermionic converter 202 in turn is conducted to and radiated from the radiator 205 whose surface 205' is the ionizer for the ion engine 206. As set forth above, a reservoir 207 is heated by a resistance circuit 208 and supplies ducts 209. The propellant vapor from the ducts 209 impinges on the ionizer surface 205' and the resulting ions are then ejected by the accelerator 210.

Figure 1:
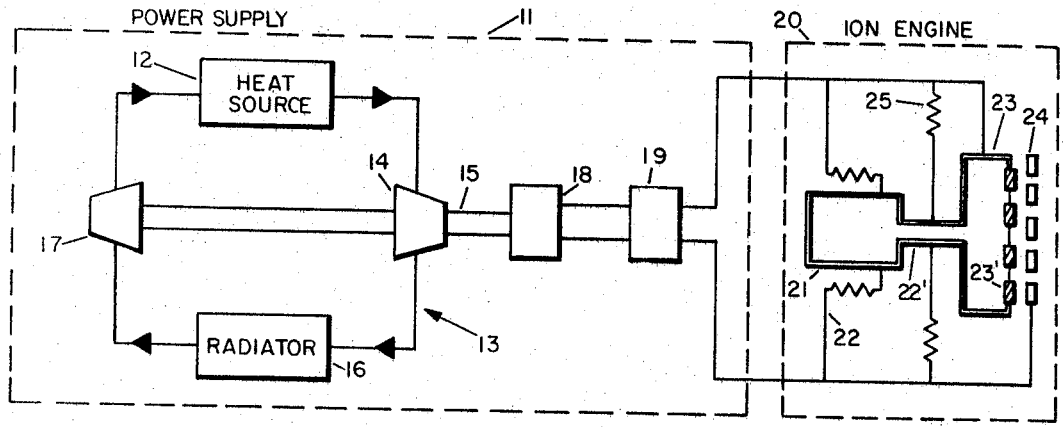
FIG. 1 is a schematic diagram of a prior art ion propulsion system which has been discussed above.

Many other specific embodiments of the present invention will be obvious to one skilled in the art in view of this disclosure. Thus, although a simple front feed system is illustrated as in FIG. 3 to show how the present invention may be utilized, the presently used rear feeding system such as illustrated in FIG. 1 may be also employed as well as a wide variety of combinations of front feeding means and ionizer surfaces. For example, the electrodes of thermionic converters and radiators in MHD converters may be used as ionizer surfaces. Furthermore, although present ion propulsion systems use propellants such as cesium or mercury, the ion propulsion system of the present invention, because of its low ionizer current density, may use a wide variety of propellant materials such as the other alkali metals. Similarly, although current ion propulsion systems utilize tungsten in the construction of the ionizer surface because of its high work function as well as other properties, a much wider variety of materials may be utilized in constructing the ionizer surface of the present invention such as materials having lower work functions.

There are many features in the present invention which clearly show the significant advance the present invention represents over the prior art. Consequently, only a few of the more outstanding features will be pointed out to illustrate the unexpected and unusual results obtained by the present invention. One feature of the present invenion is an ion propulsion system which may be formed with fewer components than presently contemplated in the propulsion systems. Thus, for example, in the present invention the radiator of the power supply means is used to perform the dual function of disposing of the waste heat from the power supply means as well as forming the hot ionizing surface for the ion engine. Similarly, the present invention eliminates the need for converting a large portion of the alternating current output of the generator or power supply means into direct current to operate the accelerator of the ion engine.

Figure 2:
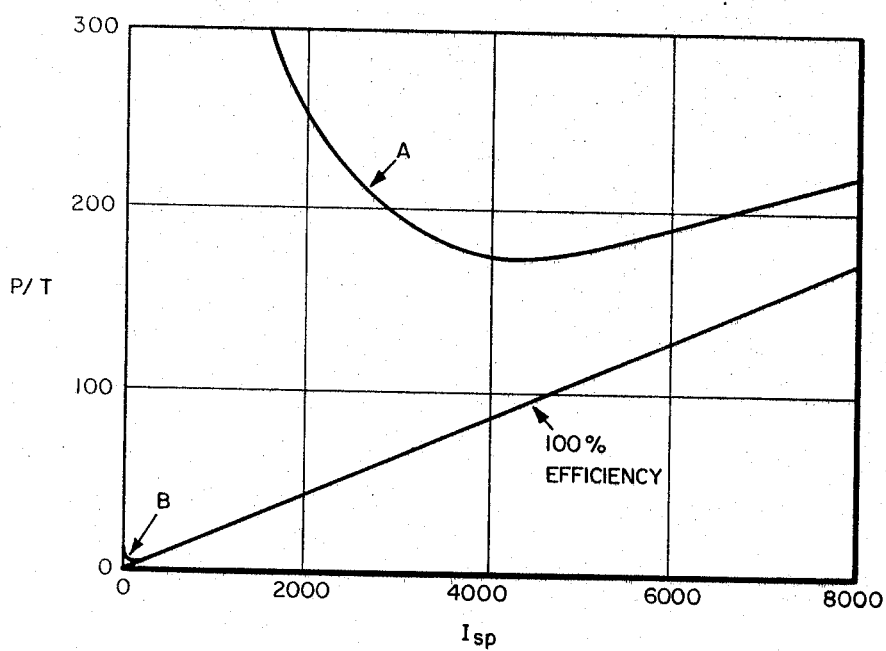
FIG. 2 is a graph illustrating the calculated operating efficiencies of the ion propulsion systems of the prior art and of the present invention.

Another feature of the present invention is the elimination of the separate ionizing surface heated by electrical power now used in ion engines. By the elimination of such requirement, the radiative heat loss term in Equation 1 is eliminated. If the performance of the resulting ion engine is then calculated on the assumption of the asumption of an ionizer current density of about 0.015 ma./cm.$^2$, then curve B in FIG. 2 is obtained. FIG. 2 shows clearly that under such conditions the ion engine of the present invention is nearly 100% efficient over a much wider range than present ion engines. Thus, the ion engine may operate down to a specific impulse of around 125 seconds before the efficiency drops to 50%. Also, an ion engine is nearly 100% efficient in the specific impulse range of 1000–4000 seconds where the presently designed plasma and magnetohydrodynamic propulsion (MHD) systems are operated.

Still another feature of the present invention is the use of a heated surface in the power supply means such as its radiator as the ionizing surface of the ion engine. The area of the power supply means heated surface such as its radiator is required by the design considerations of the power supply means to be much larger than the ionizer surface area required by prior art ion engines. Under such circumstances, the ion engine of the present invention is not required to maintain high ionizer current density in order to develop a large total thrust. Rather, low ionizer current densities in the range of about 0.001–1.000 ma./cm.$^2$ may be utilized as compared to the 10–20 ma./cm.$^2$ presently used. Using such low ionizer current densities, it can be determined that the erosion rate on parts such as the accelerator electrodes becomes relatively insignificant so that the ion engine is capable of operating for periods of years. For example, an idealized estimate of erosion rate due to direct interception may be made for the sastrugi ionizer and it is found that its lifetime is increased by several orders of magnitude.

In addition, at such low ionizer current densities, the optical requirements are not as stringent so that considerably thicker electrodes could be utilized. Thus, the use of low ionizer current densities permitted by the present invention greatly increase the life expectancy of the ion engine.

Stil another feature of the present invention is that by utilizing low ionizer current density with a large area ionizer, a front end feeding of the ionizer surface becomes possible. At present, with the high density ionizer current, if a front feeding system is utilized, the incoming atoms scatter the accelerated ions. Also, the low velocity incoming gas ions are dense enough to cause electrical discharge in the accelerator region. However, these objections to the front feeding system are substantially eliminated when a low density ionizer current is utilized. By use of the front feeding system, the present invention eliminates the problems associated with porous ionizers.

Still another feature of the present invention is that the use of low ionizer current density with a large ionizer surface makes supplying alternating current power directly to the accelerator electrodes possible. At present, when using high density ionizer current, the use of alternating current on the accelerator electrodes causes the surface of the electrode to become completely covered with a layer of adsorbed, neutral atoms and substantially reduces the number of ions emitted from the surface. Such result is obtained because the large rate of incoming atoms coupled with the period during the cycle of the alternating current when no ions are accelerated from the ionizer permits the surface of the ionizer to become rapidly covered. However, when a low density ionizer current is utilized, relatively few atoms are adsorbed on the surface of the ionizer in the portion of the acclerating current cycle when no accelerating potenial is applied between the ionizer and the accelerator electrode. Thus, the build up of the adsorbed atoms is substanially reduced so that coverage of the surface by absorbed atoms can be maintained at the same level as in present ionizers operated by direct current.

It will be understood that the foregoing description and examples are only illustrative of the present invention and it is not intended that the invention be limited thereto. All substitutions, alterations, and modifications of the present invention which come within the scope of the following claims or to which the present invention is readily susceptible without departing from the spirit and scope of this disclosure, are considered part of the present invention.

We claim:
1. An efficient, reliable ion propulsion system adapted to operate for a long time period comprising:
   (a) a power supply means including a heat source, a power conversion means for converting heat energy from said heat source into electrical energy and heat discharge means removing heat from said power supply means; and
   (b) a contact ion engine including propellant supply means for supplying propellant vapor to said heat discharge means to ionize it and accelerator means for ejecting the ionized propellant to propel said ion propulsion system, said accelerator means being energized by electrical energy from said power supply means.

2. An ion propulsion system as stated in claim 1 wherein said heat discharge means is the radiator for said power supply means.

3. An ion propulsion system as stated in claim 1 wherein said power conversion means is a thermionic converter and said heat discharge means is an element of said thermionic converter.

4. An ion propulsion system as stated in claim 1 wherein propellant supply means includes front feed means for supplying propellant vapor to said heat discharge means.

5. An ion propulsion system as stated in claim 1 wherein said power conversion means supplies alternating current to said accelerator means.

6. An efficient, reliable method of generating thrust in an ion propulsion system comprising:
   (a) forming a power supply means having a heat discharge means;
   (b) ionizing a propellant vapor by contacting it with said heat discharge means; and
   (c) accelerating the ionized propellant with power from said power supply means.

7. A method as stated in claim 6 wherein the contacting of said heat discharge means is by front feeding said propellant vapor.

8. A method as stated in claim 6 which includes generating alternating current by said power supply means and accelerating said ionized propellant with said alternating current.

References Cited by the Examiner

UNITED STATES PATENTS

| | | | |
|---|---|---|---|
| 2,883,568 | 4/1959 | Beam et al. | |
| 3,014,154 | 12/1961 | Ehlers et al. | 60—35.5 X |
| 3,099,131 | 7/1963 | Rosa | 60—35.5 X |
| 3,119,232 | 1/1964 | Richley et al. | 60—35.5 |
| 3,184,915 | 5/1965 | Low et al. | 60—35.5 |
| 3,204,889 | 9/1965 | Schwinghamer | 60—35.5 X |
| 3,210,926 | 10/1965 | Forbes et al. | 60—35.5 |

OTHER REFERENCES

Chemical and Engineering News, September 30, 1963. Pages 86—88 relied on.

Sutton, Rocket Propulsion Elements, New York, John Wiley and Sons, 1963, page 422.

CARLTON R. CROYLE, *Primary Examiner.*

MARK NEWMAN, *Examiner.*